United States Patent [19]

Cearley et al.

[11] Patent Number: 4,624,826
[45] Date of Patent: Nov. 25, 1986

[54] CONTROL ROD VELOCITY LIMITER

[75] Inventors: James E. Cearley; John C. Carruth, both of San Jose; Robert C. Dixon, Morgan Hill, all of Calif.; Stephanie S. Spencer; Jaime A. Zuloaga, Jr., both of Wilmington, N.C.

[73] Assignee: General Electric Company, San Jose, Calif.

[21] Appl. No.: 646,761

[22] Filed: Sep. 4, 1984

[51] Int. Cl.$^4$ .......................... G21C 7/20; F16F 9/00
[52] U.S. Cl. .................... 376/327; 376/234; 376/242; 376/353; 188/317
[58] Field of Search ............... 188/282, 306, 317, 320; 376/234, 242, 327, 353

[56] References Cited

U.S. PATENT DOCUMENTS

| | | | |
|---|---|---|---|
| 3,020,887 | 2/1962 | Hobson et al. | 92/26 |
| 3,395,781 | 8/1968 | Trocki et al. | 188/282 |
| 3,397,759 | 8/1968 | McClintic et al. | 376/234 |

FOREIGN PATENT DOCUMENTS

| | | | |
|---|---|---|---|
| 4750918 | 12/1972 | Japan | 376/327 |
| 5274796 | 12/1975 | Japan | 376/327 |

Primary Examiner—John F. Terapane
Assistant Examiner—Eric Jorgensen
Attorney, Agent, or Firm—Ivor J. James, Jr.; Raymond G. Simkins

[57] ABSTRACT

A velocity limiting device providing greater resistance to motion through a fluid in one direction than in the opposite direction. The device includes a toroidally shaped control member having a smooth generally conical surface on one side for low resistance movement through the fluid in the one direction. On its opposite side the control member is formed with at least one groove providing a concave surface spaced from which is an arrangement of vanes forming a jet for directing a stream of fluid into the groove upon movement in the opposite direction whereby the resultant increase in fluid turbulence increases resistance to rapid movement in this opposite direction.

12 Claims, 7 Drawing Figures

CONTROL ROD VELOCITY LIMITER

BACKGROUND

This invention relates to a velocity control device which provides relatively free rapid movement of a member in a fluid medium in one direction while providing a relatively high resistance to rapid movement of the member in the opposite direction.

The invention is useful, for example, with the selectively insertable control rods of a nuclear reactor whereby the control device allows rapid movement of the control rods into the nuclear core for rapid reactor shutdown but limits the velocity of movement of the control rods out of the core to thereby limit the rate of increase of reactivity of the core.

Previous velocity limiter devices for such purposes are shown, for example, by Trocki et al in U.S. Pat. No. 3,395,781 and by McClintic et al in U.S. Pat. No. 3,397,759 which are incorporated herein by reference. In particular the embodiment shown in FIG. 7 of McClintic et al has been used commercially long and successfully. This embodiment uses a conical velocity control member attached to the drive hub at the lower end of a control rod which, in cooperation with an annular skirt member, increases fluid turbulence and hence provides resistance to rapid downward motion of the control rod.

A drive mechanism for selectively inserting the control rods into the core is shown, for example, by R. R. Hobson et al in U.S. Pat. No. 3,020,887.

Prior control rods typically employed boron carbide, in the form of powder contained in tubes, as the neutron absorbing material.

More recently the desire for increased control rod life has resulted in the use of neutron absorber material of higher density and weight such as hafnium metal.

Since, for bottom entry control rods, the weight of the control rod constitutes at least a part of the force tending to drive the control rod downward and out of the core, a velocity limiter of greater effectiveness, to offset the greater downward force of the control rod, is desirable.

Furthermore, it is desirable that the weight of the velocity control device itself be reduced to thereby minimize the overall increase in the weight of the control rod. Minimizing weight is an important factor since the scram time (the time needed to insert a control rod into the core) is a function of the overall weight of the control rod.

Therefore, an object of the invention is a velocity limiter of increased effectiveness.

Another object is a velocity control device of decreased weight.

SUMMARY

These and other objects are achieved by a velocity control device including at least one toroidally shaped control member spaced from and coaxially positioned around the drive hub extending from the lower end of the control rod.

The control member is secured to the drive hub by a plurality of radially spaced webs. The upper side of the control member is formed with a smooth generally conical surface for minimizing resistance to upward movement through a fluid medium (such as water).

The lower or underside of the control member is formed with at least one annular groove providing a concave surface. A pair of radially spaced vanes positioned below the control member form an annular jet for directing an annular stream of the fluid at increased velocity at the annular groove in the underside of the control member when the control member, with the control rod, moves downward.

This increases fluid turbulence in passage of the fluid from below to above the velocity limiter structure. This increased turbulence thus increases the hydrodynamic resistance to movement of the control rod in the downward direction.

A plurality of spaced webs fixed to the drive hub and extending radially outward therefrom support the radially spaced vanes and are fitted with rollers at their ends for contact with the inner surface of the tubular housing for centering and guiding the hub therein.

In one embodiment of the invention, a plurality of velocity control devices, each including a control member and associated fluid jet producing vanes, are radially spaced around the drive hub with annular fluid flow passages therebetween.

In another embodiment of the invention, the lower side of the toroidally shaped control member is formed with multiple (e.g. two) adjacent grooves, the associated fluid jet producing vanes being positioned such as to direct the fluid jet at the junction between adjacent grooves.

In a modification of the second embodiment the lower or underside of the toroidally shaped control member is formed as a concave surface constituting a single groove, the fluid jet producing vanes being positioned such as to direct the fluid jet at the center of this groove.

DRAWING

DESCRIPTION

Figure 1:
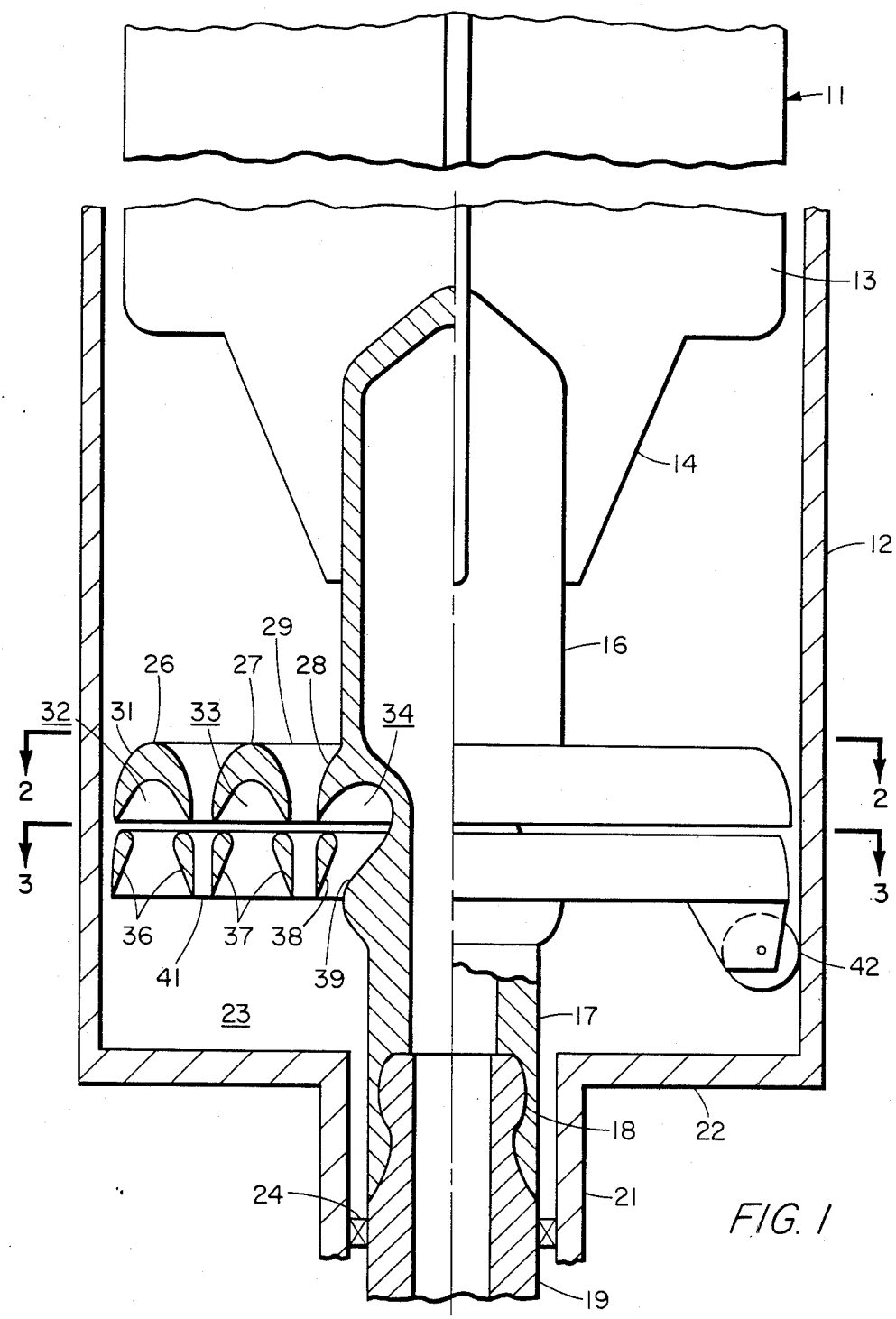
FIG. 1 is an elevation view, partly broken away and partly in section, showing an embodiment of a velocity limiter of the invention secured to the drive hub of a control rod.
Figure 2:
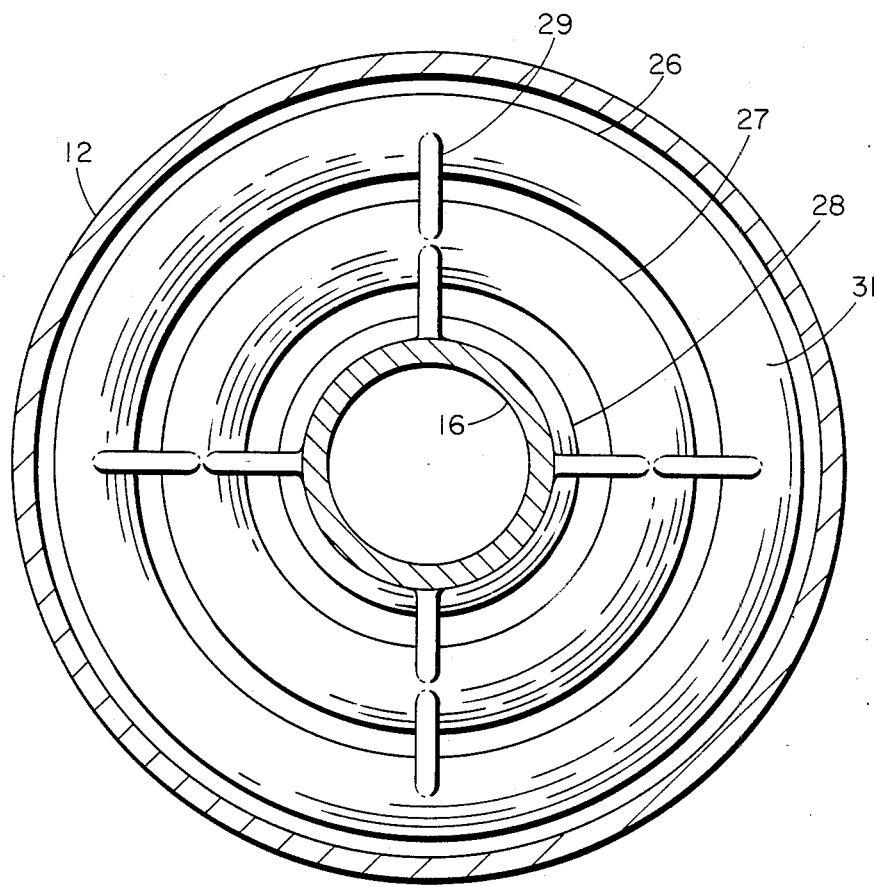
FIG. 2 is a cross section view of the embodiment of FIG. 1 taken along the line 2—2.
Figure 3:
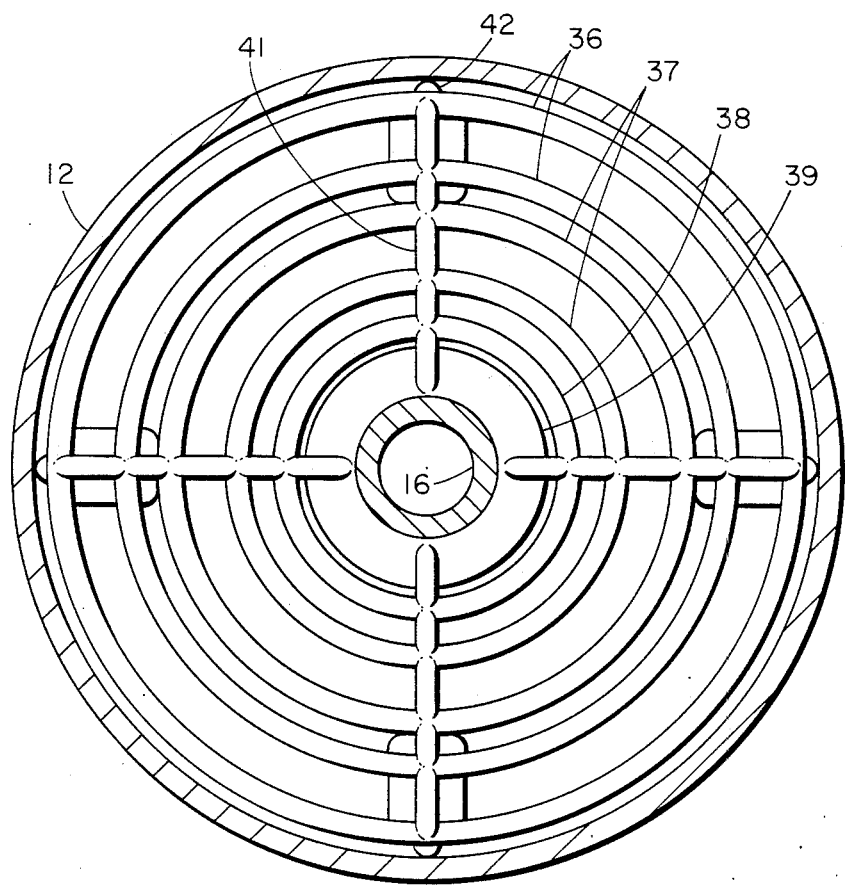
FIG. 3 is another cross section view of the embodiment of FIG. 1 taken along the line 3—3.

A first embodiment of the invention is shown in the elevation view of FIG. 1 and in the cross section views of FIGS. 2 and 3.

A control rod 11 housed in a housing or guide tube 12 is of cross or cruciform shape having four laterally extending wings 13 containing a suitable neutron absorber such as boron and/or hafnium. Such control rods and their use in a reactor core are discussed in more detail in the aforementioned U.S. Pat. No. 3,397,759.

Extensions 14 on the lower ends of the wings 13 are secured to a tubular control rod drive hub 16. Secured to the lower end of the hub 16 is a coupling socket 17 which mates with and is releasably connected to coupling fingers 18 formed in the top end of a control rod drive piston or shaft 19 housed in a drive cylinder 21.

A bottom end 22 of guide tube 12 is connected to the top end of the drive cylinder 21 to constitute a fluid containing chamber 23. The chamber 23 is filled with the coolant fluid of the reactor, e.g. water which thus constitutes the fluid medium. For completeness, a seal 24 between the movable drive shaft 19 and the stationary drive cylinder 21 is shown although it is to be understood that the control rod drive mechanism may take various forms and the actual fluid seal may be located elsewhere in the drive system. As mentioned hereinbefore, a suitable control rod drive system is shown in U.S. Pat. No. 3,020,887.

The velocity control arrangement of the invention includes at least one toroidally shaped control member and an associated pair of vanes (or their equivalent) for directing a stream or jet of fluid toward the under or lower side of the control member upon downward movement through the fluid.

Three such control members 26, 27 and 28 are illustrated in FIG. 1 spaced from one another and coaxially positioned around the hub 16. The control members 26 and 27 are secured to the hub 16 by a plurality of radially extending webs 29 (FIG. 2) while the member 28 is formed integrally with the hub 16.

The upper sides of the control members 26–28 are formed with a smooth generally conical "streamlined" upper surface 31 for minimizing resistance to upward movement through the fluid. The lower or underside of each control member 26 is formed with a respective annular groove 32, 33, 34 each providing a concave surface.

Positioned below each of the control members 26 and 27 is a respective pair of spaced vanes 36 and 37, each pair being convergent in the upward direction and forming an annular jet for directing a stream of fluid at increased velocity against the annular grooves 32 and 33 of the associated control members 26 and 27 during downward movement through the fluid. This greatly increases turbulence in the fluid in its movement from below to above the velocity limiter structure and thus increases resistance to rapid downward movement.

Associated with control member 28 is a single vane 38 which cooperates with an enlarged portion 39 of the hub 16 to form an annular jet for directing fluid at the groove 34.

As shown in FIG. 3 the vanes 36–38 are secured to the hub 16 by a plurality of radially extending webs 41. Conveniently the webs 41 may be fitted with rollers 42 at their outer ends for contacting the inner wall of the guide tube 12 for centering and guiding the hub 16 therein.

Figure 4:
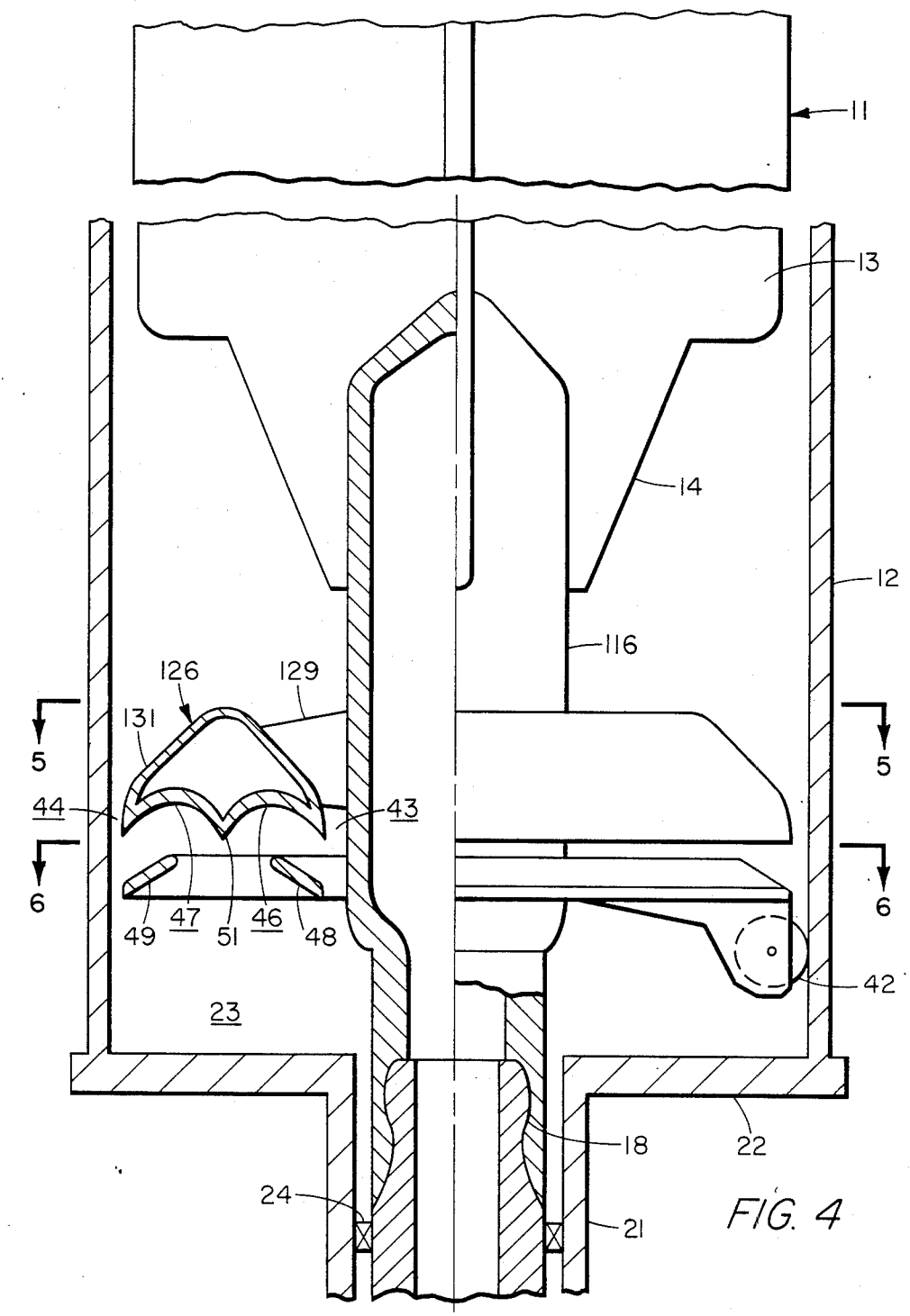
FIG. 4 is an elevation view, partly broken away and partly in section, showing another embodiment of a velocity limiter of the invention.
Figure 5:
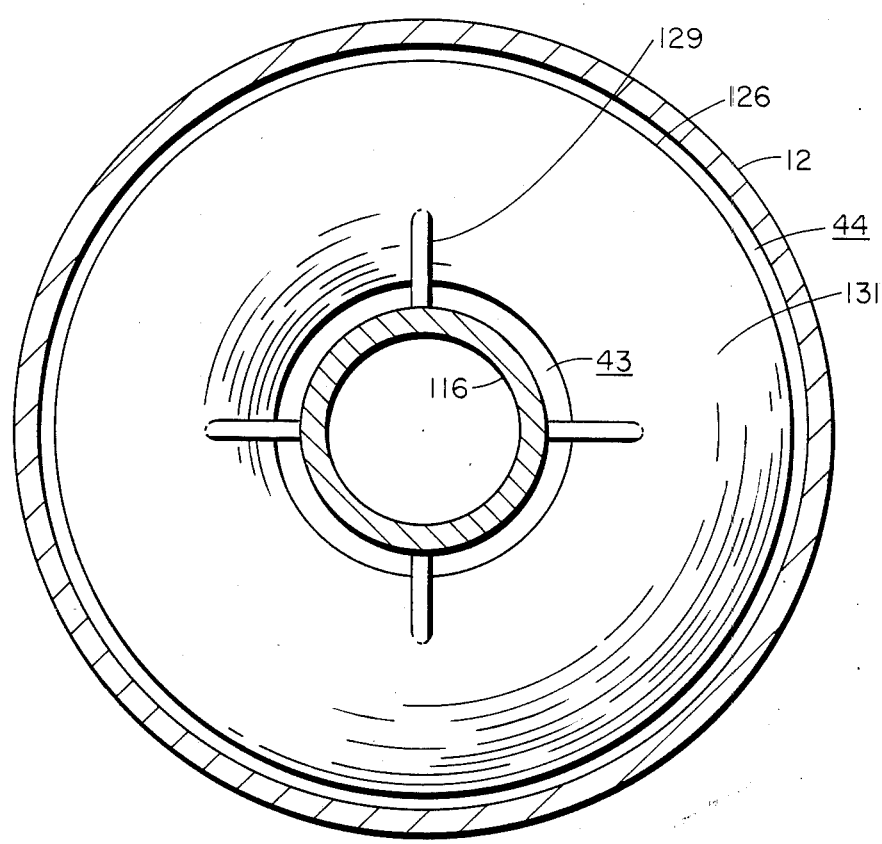
FIG. 5 is a cross section view of the embodiment of FIG. 4 taken along the line 5—5.
Figure 6:
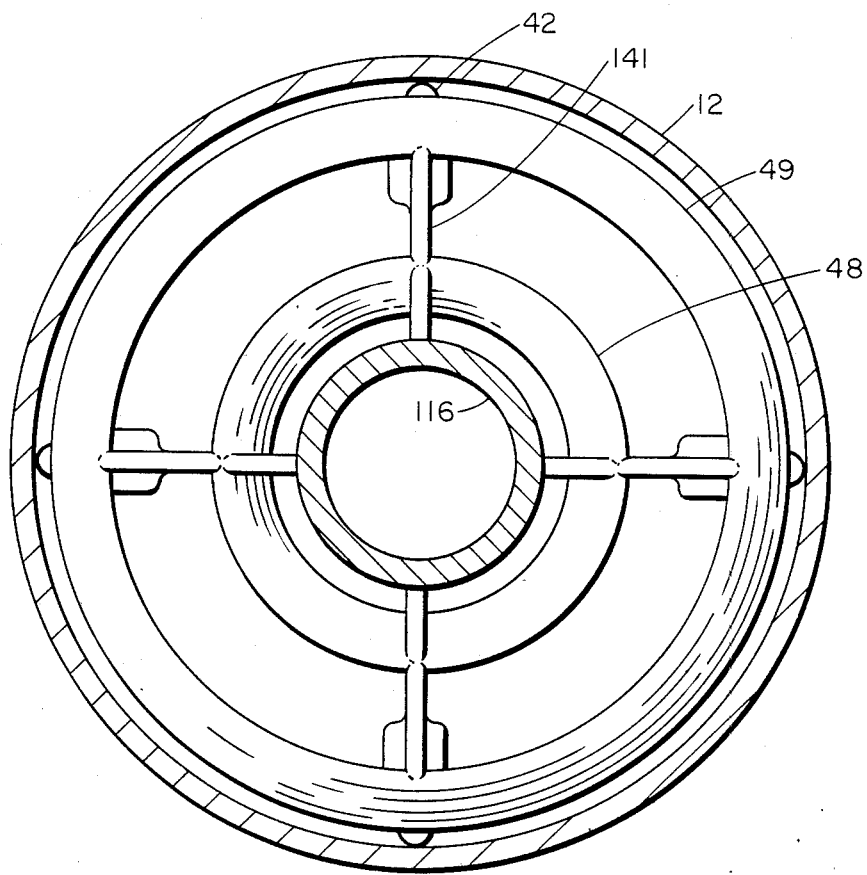
FIG. 6 is another cross section view of the embodiment of FIG. 4 taken along the line 6—6.

Another embodiment of the invention is illustrated in FIGS. 4, 5, and 6. In this embodiment a single, relatively large, toroidally shaped control member 126 is coaxially positioned around a hub 116 and is supported thereby by a plurality of radially extending webs 129 (FIG. 5). This arrangement provides an inner fluid passage 43 between member 126 and hub 116 and an outer fluid passage 44 between member 126 and the inner wall of the guide tube. The hub 116 may be tubular and the control member 126 may be hollow to reduce weight.

The upper side of the control member 126 is formed with a smooth generally conical upper surface 131 for minimized resistance to movement through the fluid in the upward direction. In this embodiment the lower or underside of the control member 126 is formed with adjacent inner and outer grooves 46 and 47.

Positioned below the control member 126 are spaced inner and outer annular vanes 48 and 49. The inner vane 48 is angled upward toward the groove 46 with its outer edge substantially in vertical alignment with the center of the groove 46 while the outer vane 49 is angled upward toward the groove 47 with its inner edge substantially in vertical alignment with the center of groove 47.

Thus the vanes 48 and 49 form an annular jet for directing a stream of fluid at increased velocity toward the common edge 51 of grooves 46 and 47 during downward movement. This greatly increases turbulence in the flow of the fluid upward through passages 43 and 44 which results in increased resistance to downward movement.

The vanes 48 and 49 are supported by a plurality of radially extending webs 141 secured to the hub 116 as shown in FIG. 6. Conveniently the webs 141 may be fitted with rollers 42 at their outer ends for contacting the inner wall of the guide tube 12 for centering and guiding the hub 16 therein.

Figure 7:
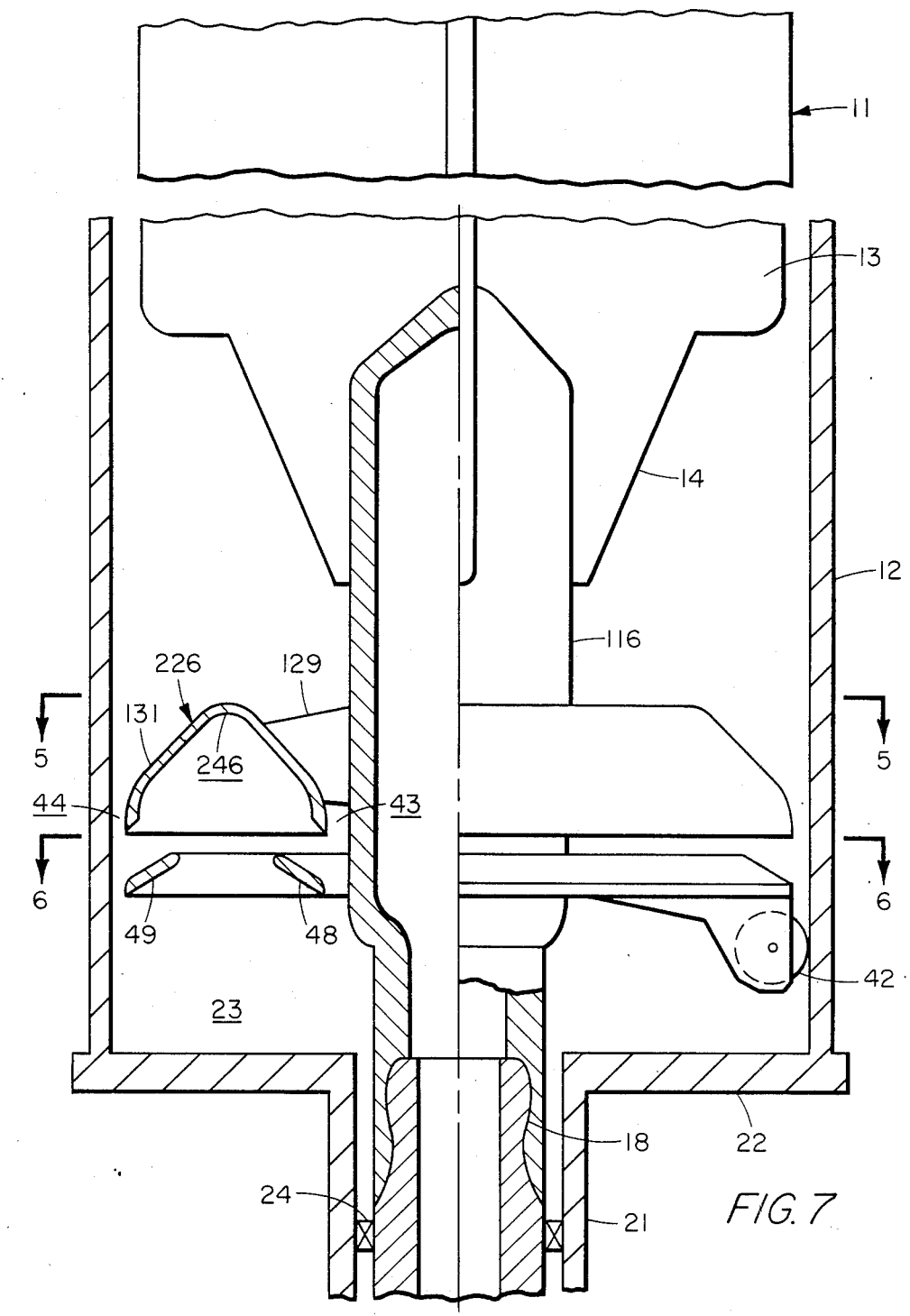
FIG. 7 is an elevation view, partly broken away and partly in section illustrating a modification of the embodiment of FIGS. 4-6.

A modification of the embodiment of the invention of FIGS. 4–6 is illustrated in FIG. 7. In this modification a toroidally shaped control member 226 is formed with the similar smooth generally conical upper surface 131 while the lower or under side of the control member 226 is formed as a concave surface constituting a single groove 246. The spaced inner and outer annular vanes 48 and 49 thus direct a stream of fluid at the center of the groove 246 during downward movement through the fluid medium which greatly increases turbulence in the flow of the fluid upward through passages 43 and 44 and thus increases resistance to downward movement.

The weight of the velocity limiter structure of the embodiment of FIG. 7 is about 32.5 lbs. as compared to a weight of about 52.5 lbs for the previous velocity limiter structure shown in FIG. 7 of U.S. Pat. No. 3,397,759. Thus the velocity limiter of the invention can provide a weight saving of about 20 lbs.

A typical control rod containing 84 rods filled with boron carbide (B$_4$C) and fitted with the velocity limiter structure of FIG. 7 of U.S. Pat. No. 3,397,759 has a weight of about 222 lbs. If 12 of the boron carbide filled rods are replaced by rods formed of hafnium metal, the weight increases to about 241 lbs.

If the previous velocity limiter is replaced by the velocity limiter of FIG. 7 of this invention, the control rod with 12 hafnium rods and 72 boron filled rods has a weight of about 221 lbs.

Thus the use of the velocity limiter of the invention allows about 14 percent of the neutron absorber material of the control rod to be long lived (albeit heavier) hafnium while maintaining substantially the same control rod weight. This provides the important advantage that the scram performance (the ability rapidly to insert the control rods into the core to shut down the reactor) is maintained.

The velocity limiter of the invention is not only lighter than the previous velocity limiter but its effectiveness in limiting free-fall or drop velocity is better.

In free-fall or drop tests in water at 550° F., a control rod fitted with the velocity limiter of FIG. 7 of U.S. Pat. No. 3,397,759 and with a weight of 190 lbs., had a drop velocity of about 2.74 feet per second.

By contrast, a control rod fitted with the velocity limiter of FIG. 7 of this invention and with a weight of about 274 lbs., had a drop velocity of about 2.3 feet per second. Thus the velocity limiter of the invention provides a slower drop velocity with a control rod that is 84 lbs. greater in weight.

What is claimed is:

1. A velocity control arrangement for a reciprocable, vertically oriented control rod for use in a nuclear reactor in a fluid medium, said control rod including a drive hub secured to and extending from one end therefrom, a control device comprising: a toroidally shaped control member spaced from and coaxially positioned around said hub and secured thereto by a plurality of spaced radial webs thereby providing an annular passage for fluid intermediate the hub and the toroidal member spaced therefrom in coaxial position, the side of said control member toward said control rod having a smooth generally conical surface, the side of said control member away from said control rod being formed with a concave surface constituting a single annular groove; inner and outer annular vanes radially spaced from one another and spaced from said side of said control member away from said control rod and positioned coaxially around and spaced from said hub and secured thereto by a plurality of spaced radial webs thereby providing an annular passage for fluid intermediate the hub and the vanes, said vanes being angled toward said control member, the outer edge of said inner vane being closer to said control member and the inner edge of said outer vane being closer to said control member whereby when said control rod moves in said fluid in the direction toward said drive hub said vanes direct a flow of fluid turbulence which provides greater resistance to movement of said control rod in the direction toward said drive hub than in the other direction.

2. The velocity control device of claim 1 wherein said control device is surrounded by a tubular fluid containing housing providing an annular fluid passage between the outer edge of said control member and said housing.

3. The velocity control device of claim 2 wherein the radial webs to which said vanes are secured are fitted with rollers at their ends for contacting the inner wall of said housing for centering and guiding said hub therein.

4. A velocity control arrangement for a reciprocable, vertically oriented control rod for use in a nuclear reactor in a fluid medium, said control rod including a drive hub secured to and extending from one end therefrom, a control device comprising: a toroidally shaped control member spaced from and coaxially positioned around said hub and secured thereto by a plurality of spaced radial webs thereby providing an annular passage for fluid intermediate the hub and the toroidal member spaced therefrom in coaxial position, the side of said control member toward said control rod having a smooth generally conical surface, the side of said control member away from said control rod being formed with adjacent inner and outer annular grooves providing concave surfaces; inner and outer annular vanes radially spaced from one another and spaced from said side of said control member away from said control rod and positioned coaxially around and spaced from said hub and secured thereto by a plurality of spaced radial webs thereby providing an annular passage for fluid intermediate the hub and the vanes, said vanes being angled toward said control member, the outer edge of said inner vane being closer to said control member and substantially in alignment with the center of said inner groove of said control member and the inner edge of said enter vane being closer to said control member and substantially in alignment with the center of said outer groove whereby when said control rod moves in said fluid in the direction toward said drive hub said vanes direct a flow of fluid toward said grooves creating fluid turbulence which provides greater resistance to movement of said control rod in the direction toward said drive hub than in the other direction.

5. The velocity control device of claim 4 wherein said control device is surrounded by a tubular fluid containing housing providing an annular fluid passage between the outer edge of said control member and said housing.

6. The velocity control device of claim 5 wherein the radial webs to which said vanes are secured are fitted with rollers at their ends for contacting the inner wall of said housing for centering and guiding said hub therein.

7. A velocity control device for a vertically oriented reciprocable control rod for use in a nuclear reactor in a fluid medium, said control rod having a drive hub secured to and extending from the lower end thereof, said control device comprising: at least one toroidally shaped control member spaced from and coaxially positioned around and spaced from said hub and secured thereto by a plurality of spaced radial webs thereby providing an annular passage for fluid intermediate the hub and the toroidal member spaced therefrom in coaxial position, the upper side of said control member having a smooth generally conical surface for minimizing resistance to upward movement through said fluid, the lower side of said control member being formed with at least one annular groove; a pair of radially spaced vanes positioned below said control member spaced from and coaxially around the hub and forming an annular jet for directing an annular stream of fluid at increased velocity against said annular groove of said control member whereby resistance to downward movement of said control member through said fluid is increased.

8. The velocity control device of claim 7 including a plurality of said control devices radially spaced around said hub.

9. The velocity control device of claim 7 wherein said control device is surrounded by a tubular fluid containing housing providing an annular fluid passage between the outer edge of said control member and said housing.

10. The velocity control device of claim 9 including a plurality of spaced radial webs extending from said hub and supporting said radially spaced vanes.

11. The velocity control device of claim 10 wherein said radial webs are fitted with rollers at their ends for contacting the inner wall of said housing for centering and guiding said hub therein.

12. The control device of claim 7 including a downwardly opening annular groove formed in an enlarged portion of said hub and vane means positioned to direct an annular jet of fluid into said groove upon downward movement of said control device in said fluid medium.

* * * * *